Sept. 25, 1951     H. F. MALONE     2,568,922
WINDSHIELD WIPER

Filed May 2, 1945     4 Sheets-Sheet 1

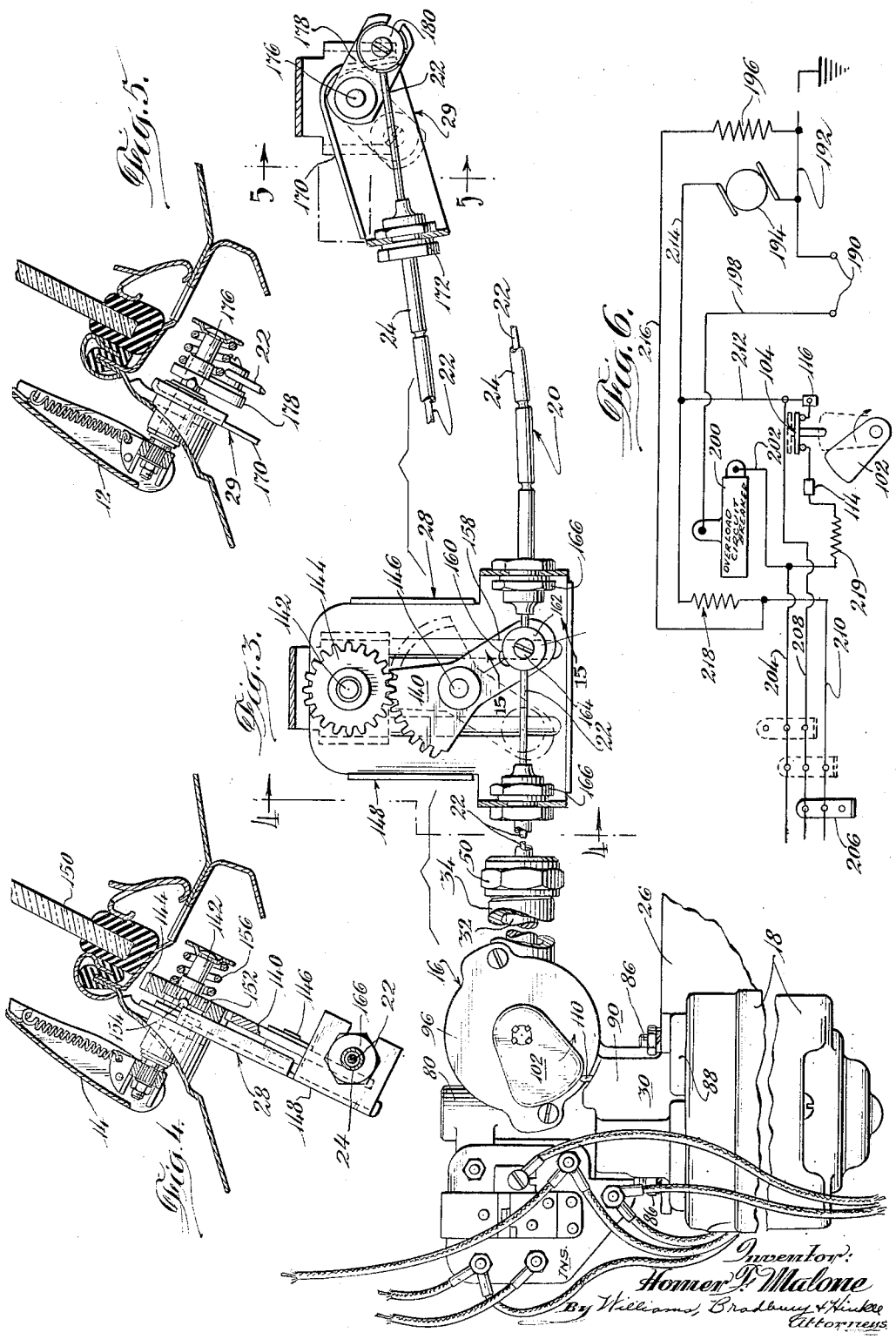

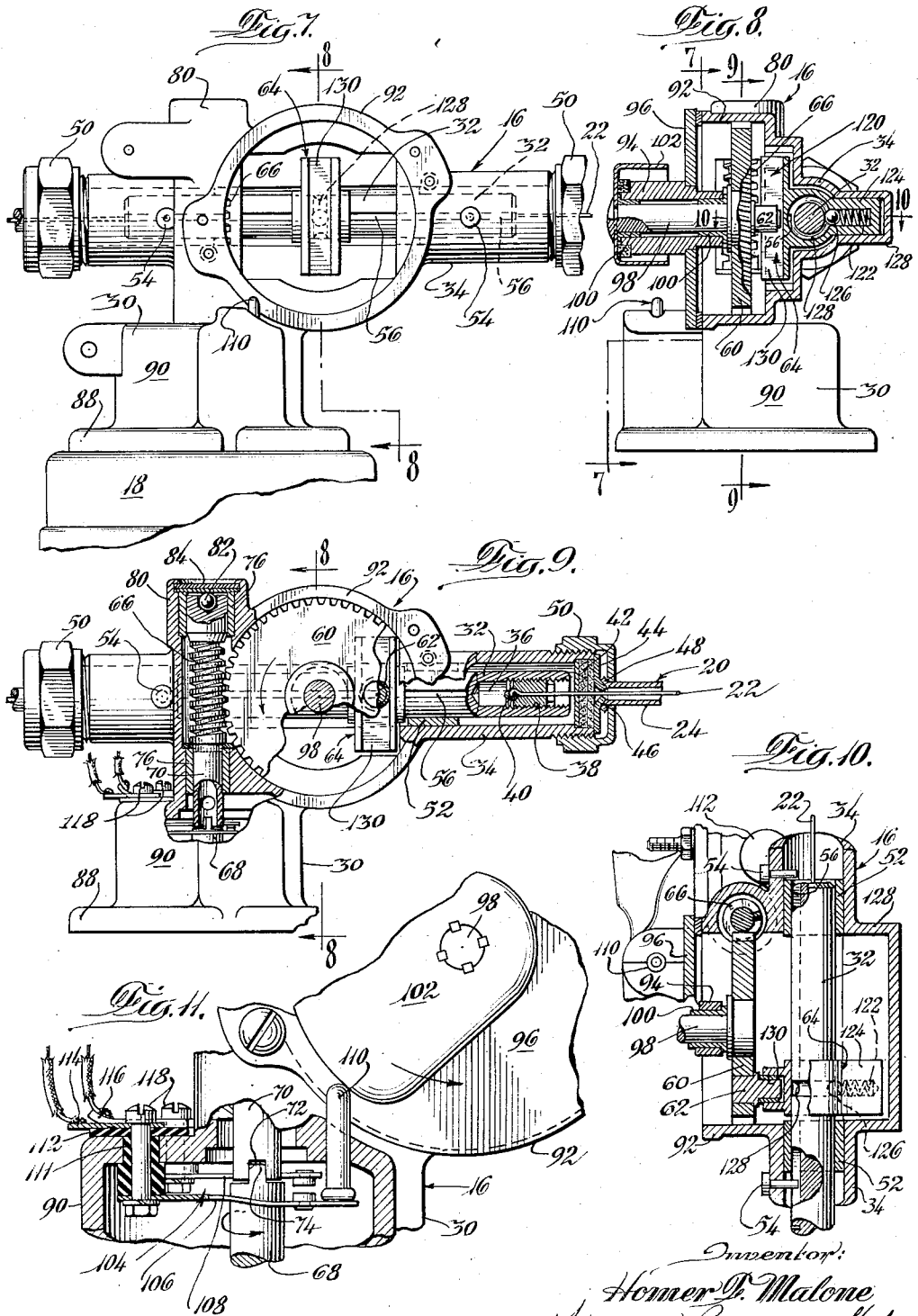

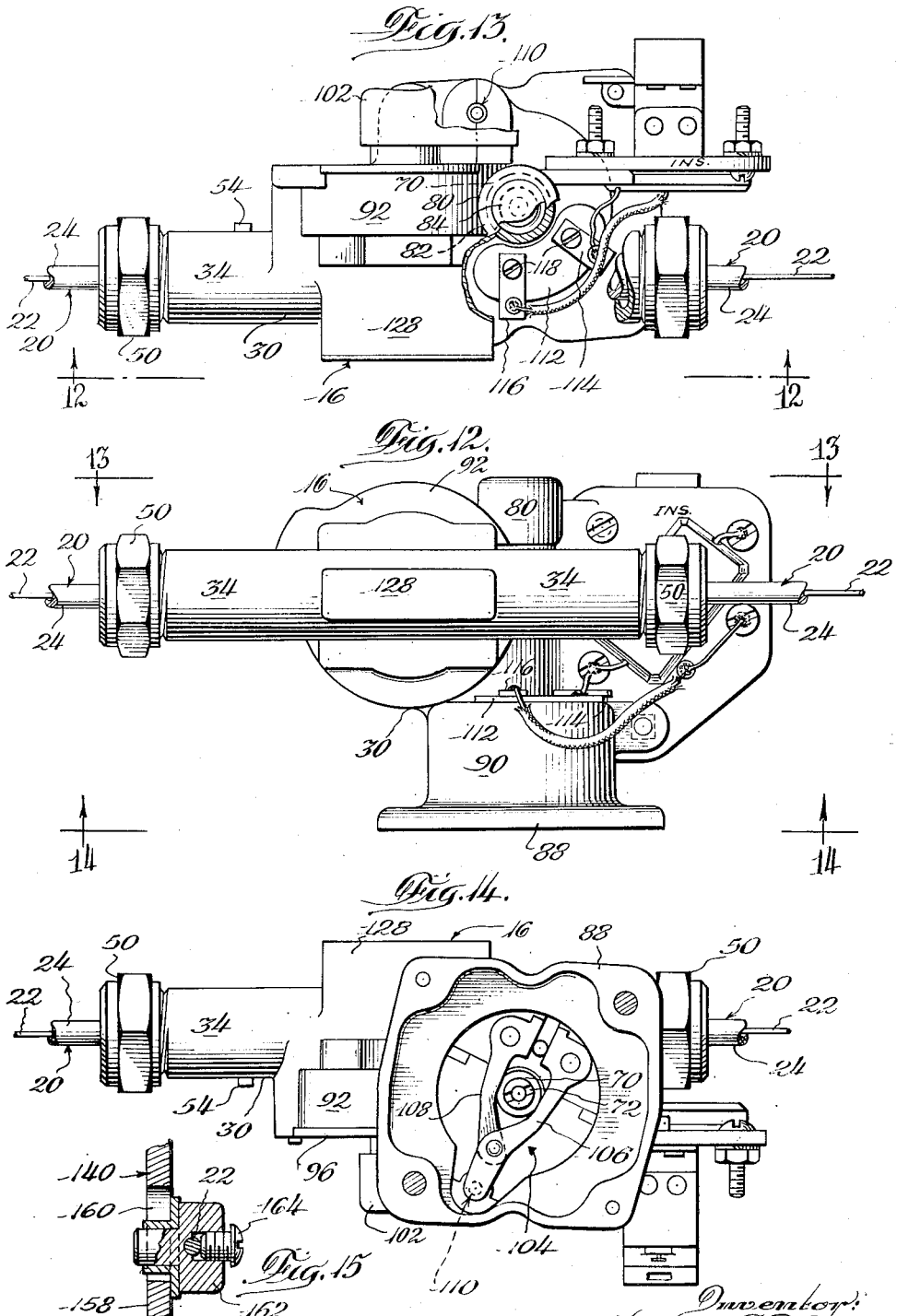

Patented Sept. 25, 1951

2,568,922

UNITED STATES PATENT OFFICE 2,568,922

WINDSHIELD WIPER

Homer F. Malone, Chicago, Ill., assignor to Stewart-Warner Corporation, Chicago, Ill., a corporation of Virginia Application May 2, 1945, Serial No. 591,467

10 Claims. (Cl. 15—253)

The present invention relates to windshield wipers and particularly to new and improved windshield wiper operating and control means.

One of the primary objects of the invention is to provide a new and improved and efficient windshield wiper which may be made and operated economically.

Another primary object of the present invention is to provide a new and improved motor operated windshield wiper which can be mounted practically anywhere under the cowl of an automobile for driving one or more windshield wipers.

Another object of the present invention is to provide a new and improved windshield wiper operating mechanism characterized primarily by a new and improved push-pull Bowden wire drive and, further, in a new and improved mechanism for translating the rotary movement of a driving motor into reciprocating movement of wire driving means.

A further object of the present invention is to provide an electrical windshield wiper of the character aforesaid wherein the wire driving means is releasably clutched to the wire so that the blades may be moved independently of the operating means, as may be desirable in the event repairs are necessary, or for any other reason.

A further object of the present invention is to provide new and improved windshield wiper control means wherein the driving motor is slowed down, preferably by reducing the voltage supplied to it, during the parking operation and prior to disconnection of the motor from its associated source of energy.

A further and another of the important objects of the present invention is the provision of a new and improved actuating means, characterized particularly in that the wire is supported in a sheath having spaced apart bearing surfaces of relatively small contact area, which sheath is preferably filled with lubricant, thereby to provide a drive having but little friction and which consequently may be easily operated and consumes but little power.

Other objects and advantages of the present invention will become apparent from the ensuing description of illustrative embodiments of the invention, in the course of which reference is had to the accompanying drawings, in which:

Fig. 3 is an enlarged elevational view, partly broken away, of the apparatus shown in Fig. 1;

Fig. 4 is a transverse vertical cross-sectional view taken along the line 4—4 of Fig. 3 illustrating details of construction of the mechanism for oscillating one of the two windshield wipers;

Fig. 5 is a view similar to Fig. 4 taken along the line 5—5 of Fig. 3 illustrating details of construction of the mechanism for oscillating the other of the two windshield wipers;

Fig. 6 is a partly schematic wiring diagram illustrating the electric circuit embodied in the apparatus and certain of the controls, notably a motor operated cam for disconnecting the motor from its source of power to park the windshield wipers;

Fig. 7 is an enlarged fragmentary side elevational view of the motor and an operating mechanism, or operating unit, for translating the rotary movement of the motor into reciprocating movement. A portion of the apparatus (primarily a cover plate and driven gear assembly) have been removed in order better to illustrate the mechanism for reciprocating the Bowden wire;

Fig. 8 is a fragmentary cross-sectional view of the operating unit taken along the line 8—8 of Fig. 7;

Fig. 9 is a vertical cross-sectional view, partly broken away, taken along the line 9—9 of Fig. 8;

Fig. 10 is a fragmentary horizontal cross-sectional view taken along the line 10—10 of Fig. 8;

Fig. 11 is a fragmentary enlarged side elevational view of the apparatus viewed in the same direction as in Figs. 7 and 8, and illustrating details of the parking switch;

Fig. 12 is a side elevational view of the operating unit from the engine side and in the direction of line 12—12 in Fig. 13;

Fig. 13 is a top plan view, partly broken away, of the operating unit;

Fig. 14 is a bottom plan view of the apparatus, as indicated by the line 14—14 in Fig. 12;

Fig. 15 is a fragmentary cross-sectional view taken along the line 15—15 of Fig. 3 and illustrating the manner in which the wiper blade oscillating means is connected to the Bowden wire.

Figure 1:
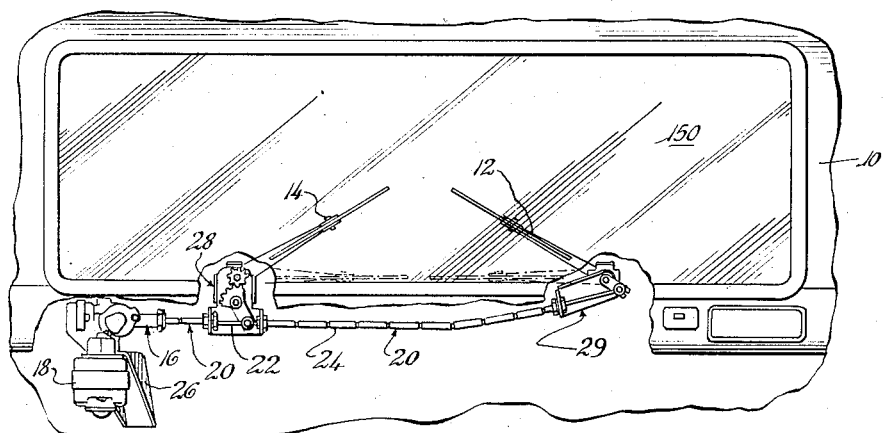
Fig. 1 is a fragmentary elevational view, partly broken away, of an automobile installation of a windshield wiper constructed and arranged in accordance with the present invention, the view being taken from inside the driver's compartment.
Figure 2:
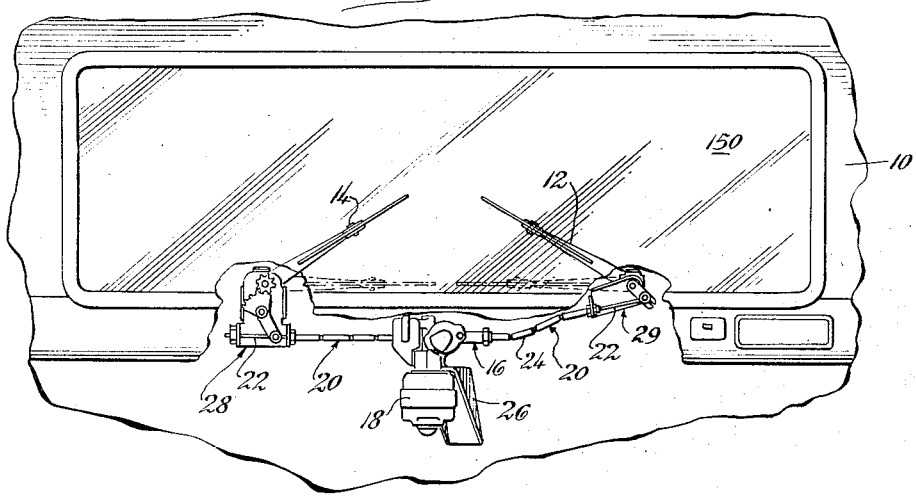
Fig. 2 is a view similar to Fig. 1 of another type of installation wherein the windshield wiper operating motor is located between two windshield wipers, as distinguished from Fig. 1, wherein the motor is located to one side of the wipers.

The simplicity of the apparatus constructed in accordance with the present invention and its adaptability to different types of installations is well illustrated in Figs. 1 and 2 to which reference will first be had. In the embodiment of Fig. 1, the windshield wiper is shown installed in an automobile 10 but it should be understood that the wiper may be installed in vehicles other than automobiles. While the principles of the invention may be utilized with the drive of one or more windshield wipers, it has been shown in connection with the drive of two having blades 12 and 14, respectively, which may be of conventional construction. The blades are moved, preferably in an oscillatory manner, by an operating mechanism or unit, indicated as a whole by the reference character 16, adapted to translate rotary into reciprocating motion, driven by a power unit consisting in this embodiment of an electric motor 18. The operating unit is connected to the wiper blades through means including actuating means 20 of the Bowden wire type and comprising a wire 22 longitudinally movable within a sheath 24 preferably enclosing the wire. The operating unit 16 and the actuating means 20 are both of a novel construction to be described in detail hereinafter.

The motor and operating units may be assembled as a unit that is secured underneath the cowl by suitable means, such as a mounting bracket 26. The longitudinal reciprocating movement of the Bowden wire 22 is in turn transformed into oscillatory movement of the wiper blades by operating mechanisms indicated generally by reference characters 28 and 29, which will be described in detail hereinafter.

In the embodiment of Fig. 1, as already indicated, the operating means 16 and motor 18 are located to one side of the blades, whereas in Fig. 2, wherein like reference characters have been utilized to indicate like or corresponding parts, the actuating means and motor have been illustrated as being mounted substantially centrally between the two windshield wiper blades.

The operating unit 16 includes a housing 30 which may be made in suitable manner, as by die-casting. It is adapted to be secured in driving relation with motor 18 and to transform the rotary movement of the motor shaft into reciprocating movement of a horizontally movable Bowden wire actuating or driving element or member 32 (see particularly Figs. 7, 8, 9 and 10) mounted for reciprocating movement within a horizontal elongated generally tubular portion 34 of the housing.

The driving member 32 is adapted to be connected to the Bowden wire actuating means at one or both ends depending upon whether the operating unit is located to one side or between the windshield wiper blades. The connection of the wires to the driving member is best indicated in Figs. 9 and 10 to which reference is now had. The driving member is provided with axial recesses 36 (only one of which is shown) at its ends. The recesses are threaded internally to receive wire anchor plugs 38 to which the end of the wire 22 is secured as by solder or the like indicated by reference character 40. The interior of the tubular portion may be filled, in part, with some suitable lubricant, the escape of which is prevented by a seal 42 at the end of the tubular portion 34 of the housing. The seal is held in place by a washer 44 having an outwardly flared apertured central portion 46 through which the wire 22 extends and which cooperates with a reversely flared portion 48 of the sheath 24 to provide means whereby an apertured plug 50 securely holds the sheath 24 to the housing.

The Bowden wire driving element 32 is supported and guided within the tubular portion 34 by a pair of spaced apart sleeved bearings 52, as best illustrated in Fig. 10. It is also guided by a pair of spaced apart pins 54, extending within the portion 34 of the housing and into a longitudinal groove 56 extending the length of the driving element.

The rotary movement of the motor is transformed into reciprocating movement of the Bowden wire driving element 32 by means of a driven gear 60 having a crank pin 62 mounted therein adapted to reciprocate a channel member 64 releasably secured to the driving element by a clutch to be described and for purposes which will be made apparent shortly. The driven gear is rotated by a vertically disposed worm 66 adapted to be driven by the motor shaft 68, see particularly Figs. 9 and 11.

The motor unit is secured to the operating unit by a slidable and detachable coupling interconnecting the motor shaft 68 and a shaft 70 of which the worm 66 forms an integral part. The coupling includes a diametrical groove 72 at the end of the worm shaft 70 and a complementary diametrical extension 74 at the end of the motor shaft. The worm shaft is rotatably supported in a pair of spaced apart sleeve bearings 76 secured in a generally tubular vertically extending portion 80 of the housing 30. The upper end of the shaft 70 is bored to receive a ball thrust bearing 82, which bears against a pair of closure plates 84 secured to the upper end of the housing portion 80, as by peening (see Fig. 9).

The motor 18 and housing 30 may be readily secured with the shafts 68 and 70 in coupled relation by a plurality of bolts 86, see Fig. 3, which are also utilized to secure the assembled unit to the mounting bracket 26. The bolts extend through an outwardly extending flange formed at the lower enlarged base portion 90 of the housing 30.

The motor 18 rotates the driven gear 60 through the coupled shafts and the worm 66 meshing with the gear. The gear is mounted within a generally cylindrical horizontally disposed portion 92 of the housing. It is part of a sub-assembly unit including a supporting bushing 94, a cover plate 96, and a driven shaft 98 at the end of which the gear is mounted. Shaft 98 is rotatably supported in a pair of spaced apart bearings 100 mounted at the ends of the bushing.

A parking switch operating cam 102, the purpose of which will be described in greater detail hereinafter, is fixedly secured to the outer end of the driven shaft 98 in suitable manner. The cam, as will appear shortly, has a predetermined positional relation relative to the windshield wiper blades and it is utilized periodically to open a parking switch, indicated as a whole by reference character 104. The switch includes a pair of resilient contact carrying switch blades 106 and 108 mounted within the base portion 90 of the housing 30. The switch blades are insulated from the housing by insulating bushings 111 and a generally arcuate insulating plate 112. The switch blades, insulation, and two terminal strips 114 and 116 are suitably secured to the housing as by bolts 118 (see Figs. 11 and 13).

The parking switch is so constructed and arranged that the circuit controlled thereby is normally closed that is adapted to be opened by the cam when the cam depresses a switch operating pin 110 (see particularly Fig. 11). The opening of the switch disconnects the motor from its associated source of energy, as will be described hereinafter, when a control switch has been operated to condition the motor for stoppage under the control of the parking switch.

The driven gear 60 reciprocates the Bowden wire driving member 32 through the crank pin 62 and the channel 64 which is releasably clutched to the driving member. The clutching means includes a spring 122 mounted within the hollow end 124 of the channel member and a ball detent 126 pressed by the spring into a groove 128 formed in the driving element 32, as best illustrated in Fig. 8. The end 124 also helps guide the channel member, it having a relatively close fit within a generally rectangular horizontal extension 128 of the housing. (See Figs. 8 and 10.) The crank pin 62 is rotated by the gear and as it rotates it reciprocates the channel 64, the crank pin fitting within a generally vertically disposed elongated channel 130 located at the inner side of the channel member, see especially Figs. 8 and 10.

Figure 16:
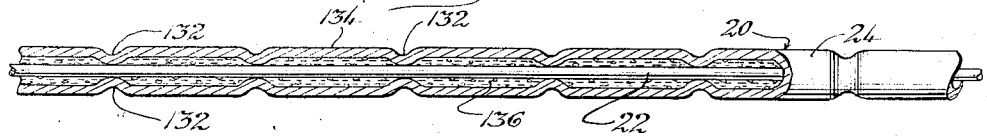
Fig. 16 is a detail view of the Bowden wire.

The reciprocating movement of the wire driving element 32 moves the wire 22 back and forth within the sheath 24. The sheath and wire constitute an actuating means of novel and improved construction characterized particularly in that the wire can be moved with but little loss of power because of friction losses. In accordance with the invention, the sheath is provided with spaced apart bearing surfaces of small contact area which preferably take the form of annular grooves 132 spaced lengthwise of the sheath as best illustrated in Fig. 16. The inner wire contacting surfaces are preferably rounded and, to decrease friction, the interbearing spaces 134 are filled with lubricant as indicated by the reference character 136. It should be noted that this actuating means contributes materially to the efficiency of the windshield wiper as a whole and that it may be utilized for other purposes, such as radio antennae, carburetor chokes and radiator shutters, to mention a few applications. Furthermore, the principles of the invention may be utilized in arrangements wherein the wire or its equivalent is given a rotary movement as distinguished from a reciprocating movement.

The windshield wiper operating mechanisms 28 and 29 are preferably so constructed and arranged that the two blades are moved in opposite directions as the wire 22 is moved. This is readily accomplished by connecting the actuating wire 22 directly or through gears to the respective blade operating shafts as will now be described in greater detail.

The operating mechanism 28 for windshield wiper blade 14 includes a sector gear 140, oscillated by reciprocation of wire 22, and connected to the blade oscillating shaft 142 through a pinion 144. The sector gear 140 is pivotally secured to a shaft 146, which together with shaft 142 are secured to a suitable mounting bracket, indicated generally by reference character 148, adapted suitably to be secured to the automobile underneath the cowl and below the windshield 150, as best illustrated in Fig. 4. The pinion 144 is resiliently clutched to the shaft 142 by a grooved plate loosely encircling the shaft and cooperating with a pin 154 extending through the shaft. The pin and plate are held in clutched relation by the spring 156.

The sector gear 140 is connected to the wire 22 through a lost motion connection including a crank arm 158 integral with the gear and having a slot 160 at its outer end adapted slidably to receive wire fastening means. The latter includes an apertured pin 162 through which the wire 22 extends and to which the wire is secured as by a screw 164 (see especially Fig. 15).

The Bowden wire is guided in its movement near the mounting bracket 148 by bushings 166 which are utilized also to secure the sheath 24 to the mounting bracket.

The operating mechanism 29 for windshield wiper blade 12 is mounted upon a mounting bracket 170 to which the sheath 24 is secured by a bushing 172. The wiper blade is secured to a shaft 176 pivotally mounted in the mounting bracket and oscillated by a crank arm 178 resiliently clutched to shaft 176 and to the free end of which the wire 22 is secured by fastening means 180 similar to the fastening means 162 heretofore described.

It may be well perhaps to mention at this point that the windshield wiper operating mechanisms may be designed to give any desired range of movement to the windshield wiper blades and that the control may be so contructed and arranged so as to park the blades at one end of the range of movement of the blades. In Figs. 1 and 2 the parked position has been indicated as being near the bottom and at the center of the windshield.

The windshield wiper control of the present invention is also of an improved type, it providing means for slowing down the motor when the motor is placed under the control of the parking switch 104 which is effective to disconnect the motor for its supply of power when the windshield wiper blades are at a desired parking position. The slowing down is preferably accomplished either by reducing the voltage applied to the motor or changing the motor connections or both, as is the case with the control illustrated in Fig. 6 to which reference is now had. Power is supplied from suitable source such as a battery (not shown) adapted to be connected to the terminals 190. One of the terminals is connected to ground through conductor 192, which conductor is likewise connected to one side of the motor armature 194 and to one side of the motor field 196. The other power terminal is connected by conductor 198 to an overload circuit breaker 200 which is connected in turn to conductor 202 having a branch conductor 204 leading therefrom to a three-position manually operable control switch 206 shown by solid lines in its off position.

The control switch has two operative positions, one for slow speed and the second for fast speed operation of the wiper blades as indicated by the two phantom positions of the switch. In the slow speed position the motor is operated with a full shunt field. The switch at this time connects conductor 204 to conductors 208 and 210. The conductor 208 is connected to the other side of the motor armature through conductors 212 and 214. Conductor 210 is connected directly to the other side of the motor field through conductor 216. Accordingly with the switch 206 in its slow speed position the motor operates with full field and at slow speed.

When the control switch is operated to its fast speed position conductors 204 and 208 are interconnected with the result that the motor armature is energized as it was heretofore but a resistor 218 is now effectively placed in series with the field winding 196, thereby to decrease the motor field as a result of which the motor operates at a faster speed. The resistor 218 is not effective during low speed operation, it being short circuited. The resistor may have a value such that it decreases the motor field voltage one or two volts for 6 and 12 volt power supplies.

The parking switch 104, while periodically opened during operation of the motor at either slow or fast speed, does not exert any control upon the motor during normal operation. It is, however, placed in control of the motor and effects stoppage of the motor with the wiper blades in a predetermined position when the control switch 206 is moved from either of its two operating positions to its off position. When the switch is moved to its off position, the motor is energized at reduced voltage and also connected for slow speed operation, the control switch 206 conditioning the apparatus for slow speed operation and the parking switch 104 maintaining the motor energized through a circuit including the switch and a resistor 219 until the switch 104 is opened. The energizing circuit during the parking operation extends through conductor 198, the overload circuit breaker 200, resistor 218, the parking switch 104 in closed position, conductor 212 and then through conductor 214 to the armature and through resistor 218 to the motor field 196. When switch 104 opens, the motor is deenergized and stops.

From the foregoing detailed description of the present invention, it may be noted that the windshield wiper may be constructed readily and economically and that it may be readily mounted practically anywhere underneath the cowl of an automobile or for that matter in any suitable place in various types of vehicles. It is economical to operate because the motor continuously rotates in one direction and because only slight power is lost because of friction losses in the novel actuating means including the Bowden wire and its associated sheath with a plurality of spaced apart small contact area bearing surfaces.

Furthermore the operating unit 16 constitutes a structural unit which may be readily secured to the motor unit 18 in such manner that the two may readily be mounted upon suitable mounting means such as a simple bracket. When the two units are placed together, the motor shaft is automatically connected with the worm shaft so that rotation of the motor rotates the driven gear 60, which thereupon reciprocates the channel member 64 which is resiliently clutched to the wire driving member 32. Both the channel member and driving member are guided in their reciprocating movements, the former by a portion of the housing and the latter by the housing and the pins 54 which prevent it from rotating.

As can be understood from the foregoing description, one of the stated objects of the present invention of providing means whereby the wiper blades may be manually moved independently of the operating means, as may be desirable in making repairs or cleaning the windshield, has been accomplished by providing a Bowden wire driving member 32 which is releasably clutched to the reciprocating slide or channel member 64, such that when the wiper blades are manually moved the driving member will be automatically declutched from the electric power operating means, thereafter permitting the blades to be moved to any position within the confines of their wiping arc. When the operating mechanism is again put into operation the channel slide member 64 will reciprocate into clutching relation with the driving member, thereby causing the wiper blades to be operatively connected with the operating mechanism.

The operating mechanism may be used in conjunction with one or more windshield wiper blades and with one or more Bowden wires, depending upon whether the unit is to be located to one side or between the wiper blades. An individual wiper blade operating mechanism may readily be secured to some intermediate point along the wire, as illustrated best in Fig. 3, simply by removing a portion of the sheath to expose the wire for connection to suitable operating means.

The control of the windshield wiper is simple and the provision of means for reducing the voltage and connecting the motor for slow speed operation during the parking better insures parking of the wiper blades at a desired position.

While the present invention has been illustrated and described in connection with specific structural details, it should be understood that these are not intended to be limitative of the invention except in so far as set forth in the accompanying claims.

Having thus described my invention, what I claim as new and desire to secure by Letters Patent is:

1. An electric windshield wiper, including in combination, means including Bowden wire actuating means for moving the wiper, and means including a motor rotatable in one direction and means actuated thereby for translating uni-directional rotary to reciprocating motion for moving said Bowden wire, said motion translating means including a crank pin rotated by the motor, a channel member having a hollow projecting portion and slidably receiving said crank pin, a generally cylindrical elongated driving member secured to the wire and in slidable engagement with said channel member, and clutch means including a clutch member in the hollow portion of the channel member for detachably securing the driving member to the channel member.

2. An electric windshield wiper, including in combination, means including Bowden wire actuating means for moving the wiper, and means including a motor rotatable in one direction and means actuated thereby for translating uni-directional rotary to reciprocating motion for moving said Bowden wire, said motion translating means including a motor driven gear having a crank pin and rotated by the motor, a housing for the gear having a cover plate constructed as an assembly unit with said gear, a channel member having a hollow projecting portion slidably receiving said crank pin, a generally cylindrical elongated driving member secured to the wire and in slidable engagement with said channel member, and clutch means including a clutch member in the hollow portion of the channel member for detachably securing the driving member to the channel member.

3. An electric windshield wiper, including in combination, means including Bowden wire actuating means for moving the wiper, and means including a motor rotatable in one direction and means actuated thereby for translating unidirectional rotary to reciprocating motion for moving said Bowden wire, said motion translating means including a crank pin rotated about a predetermined axis by the motor, an apertured channel member having a hollow projecting portion and a channel at right angles to said axis slidably receiving said crank pin, a generally cylindrical elongated driving member secured to the wire and extending through the aperture in the channel member, clutch means including a clutch member in the hollow portion of the channel member for detachably securing the driving member to the channel member, and a housing guiding movement of said driving and channel members.

4. Apparatus for operating a windshield wiper, including in combination, a rotatable crank pin, a channel member having a hollow projecting portion and slidably receiving said crank pin, a generally cylindrical elongated driving member in slidable engagement with said channel member, and clutch means including a clutch member in the hollow portion of the channel member for detachably securing the driving member to the channel member.

5. Apparatus of the character described, including in combination, a crank pin rotatable about a predetermined axis, an apertured channel member having a hollow projecting portion and a channel at right angles to said axis slidably receiving said crank pin, a generally cylindrical elongated driving member slidably extending through the aperture in the channel member, clutch means including a clutch member in the hollow portion of the channel member for detachably securing the driving member to the channel member, and a housing guiding movement of the driving and channel members.

6. Control apparatus for an electric motor operated windshield wiper, including in combination, means including a pair of motor control circuits and a manually operable control switch selectively rendering said circuits effective for operating said motor at slow and fast speeds, a stopping circuit for the motor including a motor operated cam switch adapted to be opened when the wiper blade is in a predetermined position, said control switch being operable also to an off position, and means including circuits associated with said manual and cam switches for rendering said cam switch and stopping circuit effective when the motor is connected for slow speed operation.

7. In a windshield wiper having reciprocable wiping means, the combination of a rotary power source, first means reciprocable in a predetermined direction for driving the wiping means, second means reciprocable in the same direction adjacent the first means, means driven by the rotary source to impart reciprocating movement to the second means, and interengageable clutch means comprising a detent and a socket for engaging the same respectively carried by the first and second means to form a disengageable driving connection between them.

8. In a windshield wiper having a cleaning mechanism driven by an electric motor, the combination of manually operable switch means having running and stopping settings, parking switch means having running and stopping settings, a cam driven by the cleaning mechanism for shifting the parking switch means from its running to its stopping setting, a running circuit operated by the manually operable switch means when it is in its running setting to apply a normal voltage to the motor to run the motor at normal speed, and a parking circuit operable by the parking switch means when it is in its running setting including means to apply a voltage to the motor differing substantially from the normal voltage to run the motor substantially slower than normal speed, the running circuit being arranged to render the parking switch means ineffective when the manually operable switch means is in its running setting, and the running and parking circuits being arranged to stop the motor when both switch means are in their stopping settings.

9. In a windshield wiper having a cleaning mechanism driven by a direct current motor having a shunt field, the combination of manually operable switching means having running and parking settings, a parking switch, a cam driven by the cleaning mechanism for opening the parking switch, a running circuit operated by the manually operable switching means when it is in its running setting to run the motor at a predetermined speed, the running circuit including current reducing means connected in circuit with the shunt field of the motor, and parking circuit means to energize the motor through the parking switch when the manually operable switching means is in its parking setting, the manually operable switching means including means to cut out the current reducing means to run the motor substantially below the predetermined speed when the switching means is in its parking position.

10. In a windshield wiper having a cleaning mechanism driven by an electric motor, the combination of manually operable switch means, circuit means interconnecting the switch means and the motor to apply a normal voltage to the motor when the switch means is closed to operate the motor at normal speed, a parking circuit providing an alternate path around the switch means to run the motor substantially slower than normal speed when the switch means is open, the parking circuit including a parking switch and voltage reducing means, and a cam driven by the cleaning mechanism to open the parking switch to stop the motor provided the manually operable switch means is also open.

HOMER F. MALONE.

REFERENCES CITED

The following references are of record in the file of this patent:

UNITED STATES PATENTS

| Number | Name | Date |
| --- | --- | --- |
| 1,447,541 | Gates | Mar. 6, 1923 |
| 1,553,621 | Locklin | Sept. 15, 1925 |
| 1,668,278 | Langdon | May 1, 1928 |
| 1,839,175 | Hueber | Dec. 29, 1931 |
| 2,257,098 | Arens | Sept. 30, 1941 |
| 2,259,790 | Auten | Oct. 21, 1941 |
| 2,264,013 | Webb | Nov. 25, 1941 |
| 2,345,250 | Fishburn | Mar. 28, 1944 |
| 2,376,010 | Sacchini et al. | May 15, 1945 |
| 2,393,193 | Sacchini | Jan. 15, 1946 |